United States Patent
Ummadi et al.

(10) Patent No.: US 10,694,766 B2
(45) Date of Patent: Jun. 30, 2020

(54) AERATED FROZEN CONFECTIONARY PRODUCT

(75) Inventors: Madhavi Ummadi, Bakersfield, CA (US); Nirav Chandrakant Pandya, Bakersfield, CA (US); Kenneth Richard Moffitt, Bakersfield, CA (US)

(73) Assignee: Societe des Produits Nestle S.A., Vevey (CH)

(*) Notice: Subject to any disclaimer, the term of this patent is extended or adjusted under 35 U.S.C. 154(b) by 695 days.

(21) Appl. No.: 14/389,435

(22) PCT Filed: Mar. 30, 2012

(86) PCT No.: PCT/US2012/031451
§ 371 (c)(1),
(2), (4) Date: Sep. 30, 2014

(87) PCT Pub. No.: WO2013/147847
PCT Pub. Date: Oct. 3, 2013

(65) Prior Publication Data
US 2015/0064330 A1  Mar. 5, 2015

(51) Int. Cl.
| A23G 9/34 | (2006.01) |
| A23G 9/46 | (2006.01) |
| A23L 29/25 | (2016.01) |
| A23G 9/38 | (2006.01) |

(52) U.S. Cl.
CPC .............. *A23G 9/34* (2013.01); *A23G 9/46* (2013.01); *A23L 29/25* (2016.08); *A23G 9/38* (2013.01); *A23V 2002/00* (2013.01)

(58) Field of Classification Search
CPC ... A23G 9/38; A23G 9/40; A23G 9/34; A23G 9/46; A23L 29/25

USPC ................................ 426/519, 565, 569, 567
See application file for complete search history.

(56) References Cited

U.S. PATENT DOCUMENTS

| 3,806,608 | A | * | 4/1974 | Perret | A23L 15/35 |
| | | | | | 426/535 |
| 5,645,881 | A | | 7/1997 | Tancibok et al. | |
| 5,968,582 | A | * | 10/1999 | Vaghela | A23G 9/46 |
| | | | | | 426/515 |
| 2003/0134025 | A1 | * | 7/2003 | Vaghela | A23G 9/32 |
| | | | | | 426/565 |
| 2005/0124805 | A1 | * | 6/2005 | Al-Assaf | A23L 33/12 |
| | | | | | 536/27.4 |

FOREIGN PATENT DOCUMENTS

| WO | WO-2010069727 A1 * | 6/2010 | .............. A23G 9/14 |
| WO | WO 2010092091 A1 * | 8/2010 | .............. A23G 9/38 |

OTHER PUBLICATIONS

Gum Technology in the food industry by Martin Glicksman—Academic Press 1969 Chapter 4: Natural Plant Exudes pp. 94-105. (Year: 1969).*
Gum Technology in the food industry by Martin Glicksman—Academic Press 1969 Chapter 4: Natural Plant Exudates pp. 94-111, 124-129. (Year: 1969).*

* cited by examiner

*Primary Examiner* — Jyoti Chawla
(74) *Attorney, Agent, or Firm* — K&L Gates LLP

(57) ABSTRACT

The present invention relates to an aerated frozen confection with an overrun of between 120% and 160%, which includes acacia gum as all or part of a natural emulsifier. A process for the preparation of this frozen confection is also disclosed.

19 Claims, 2 Drawing Sheets

AERATED FROZEN CONFECTIONARY PRODUCT

CROSS REFERENCE TO RELATED APPLICATIONS

Figure 1:
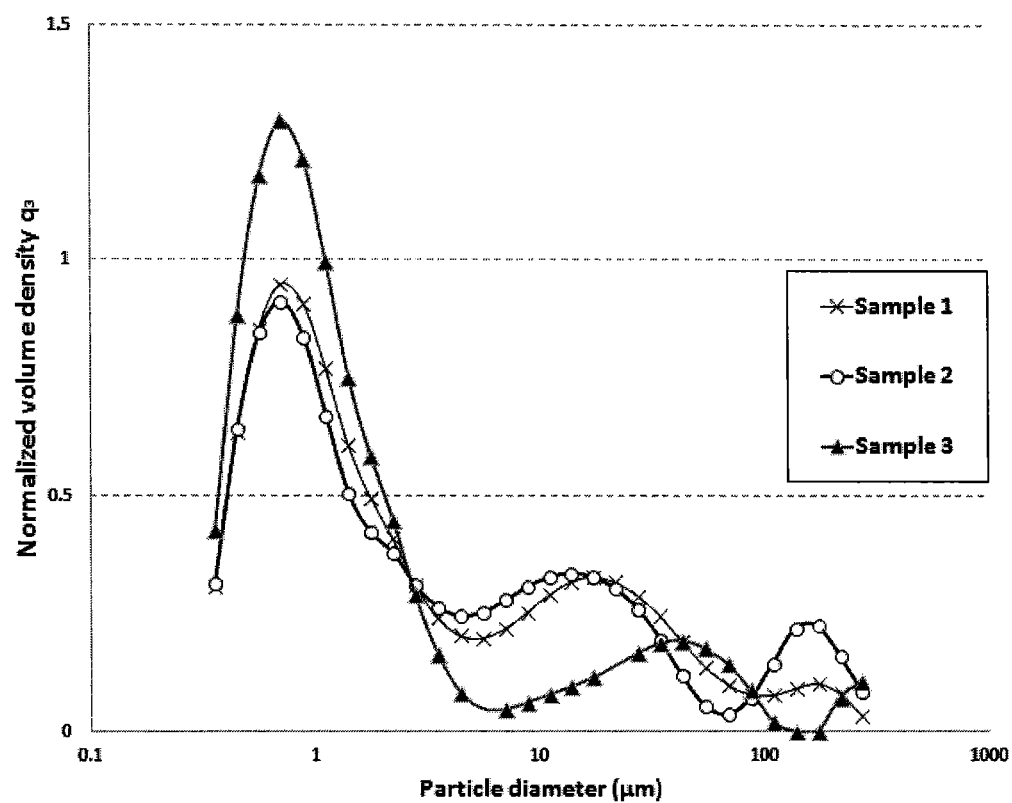

The present application is a National Stage of International Application No. PCT/US2012/031451, filed on Mar. 30, 2012, the entire contents of which are being incorporated herein by reference.

FIELD OF INVENTION

The present invention relates to a frozen confectionary product with a high overrun comprising acacia gum as a natural emulsifier. The present invention also relates to a method of manufacture for the frozen confectionary product.

BACKGROUND OF THE INVENTION

Cleaner or clean label products are becoming more and more popular among ice cream consumers. The demand is in particular directed to products that are free from artificial ingredients such as artificial flavors, colors and emulsifiers, defined as "additives" or ingredients with so-called "E-numbers".

While the replacement of artificial flavors and colors by natural ingredients may not have a major impact on the key attributes of the product, the functionality of stabilizers and emulsifiers is such that their replacement by natural ingredients is very challenging. In fact, those ingredients play an important role in terms of texture, scoopability, melting rate, heat shock resistance and shelf-life of the frozen confectionary products.

The term "heat shock" as used herein, unless otherwise indicated, means the temperature fluctuations related to the storage and transportation of frozen confections. Heat shock can be simulated by treating a frozen ice cream product to temperature cycling of about −8 C to about −20° C. every 12 hours, with 30 min temperature ramp time for a period of about two weeks, or by any other method commonly used in the industry. Efficient emulsifiers well known and widely used in any range of frozen confectionary products include ingredients defined as "additives" or ingredients with so-called "E-numbers". Examples of such additives often found in frozen confectionery formulations include mono- and diglycerides of fatty acids, esters of mono- and digylcerides of fatty acids, polyglycerol esters of fatty acids, polysorbates etc. They have certain drawbacks. These emulsifiers are in fact perceived as "non-natural" ingredients, deemed to be unhealthy in the eyes of the consumer. The presence of these ingredients in frozen confection recipes leads to reduced authenticity of the frozen confectionary products.

Natural emulsifiers are known but they are often not as efficient as any known additives to stabilize frozen confections and their use has therefore been limited heretofore to products easier to stabilize such as "premium" or "super premium" products.

Such "premium" range of frozen confectioneries is usually characterised by a rather low overrun e.g. below 50%, high levels of fat and high levels of protein. Their total solid content is also usually above 40 wt %. The low overrun in these products provides them with a low thermal sensitivity and therefore these products are less affected by heat shock. On the other hand, the high protein content usually compensates the need of any "non natural" emulsifier. However the proteins being expensive, this solution is not preferred for standard or "mainstream" frozen confectionary products.

For example, EP 2025240 discloses a natural stabiliser system that can be used in the manufacture of natural frozen confectionary products. The stabiliser system of EP 2025240 comprises native rice starch and fibres from vegetables, fruits or mixtures thereof. Starch is a carbohydrate and the use of starch is a nontraditional component of frozen confectionary products. EP 2025240 publication discloses frozen confectionary products which are aerated with an overrun of 20-80%, and products with a protein content higher than 3%. EP 2025240 publication fails to disclose solutions suitable for mainstream range.

Mainstream frozen confectionary products are usually characterised by an overrun above 80% and their content in protein is lower than that of "premium" frozen confectioneries, to make such products affordable to most consumers.

Providing mainstream frozen confectionary products using natural ingredients while not compromising on the product stability is a challenge. Premium ice creams are usually made with fat from a dairy source and contain little or no fat from a vegetable source. These frozen confectionary products are expensive to manufacture and thus costly to the consumer due to the high load of quality ingredients. These products can also be seen as unhealthy due to the high levels of fat and sugars.

WO 2012/016816 relates to mainstream products and describes a solution based on the use of egg yolk as natural emulsifier. However the use of egg yolk might be limited due to allergen issues of some consumers.

There is thus a need to overcome the deficiencies as known in the prior art.

SUMMARY OF THE INVENTION

The purpose of the invention is to overcome the deficiencies of the prior art and to make stable aerated frozen confections with overrun higher than 120% and up to 160%. The solution provided by the present invention is based on the use of acacia gum as a natural emulsifier.

A first embodiment of the invention is an aerated frozen confection with an overrun comprised between 120% and 160%, comprising from 0.5 to 20 wt % fat, from 5 to 15 wt % milk solids-non-fat, from 5 to 35 wt % of sweetening agents, up to 6 wt % stabilizer and up to 0.5 wt % of a natural emulsifier, wherein the natural emulsifier comprises acacia gum.

A second embodiment of the invention is a method for preparing an aerated frozen confection as defined above, comprising the steps of a) preparing a base mix comprising from 0.5 to 20 wt % fat, from 5 to 15 wt % milk solids-non-fat, from 5 to 35 wt % of a sweetening agent, up to 6 wt % of a stabilizer and up to 0.5 wt % of a natural emulsifier comprising acacia gum; b) homogenizing and pasteurizing the base mix; c) freezing while aerating the mix to provide an end product with an overrun comprised between 120 and 160%; d) optionally hardening the frozen mix.

BRIEF DESCRIPTION OF THE DRAWING FIGURES

FIG. 1: represents particle size distributions of products according to the invention.

Figure 2A:
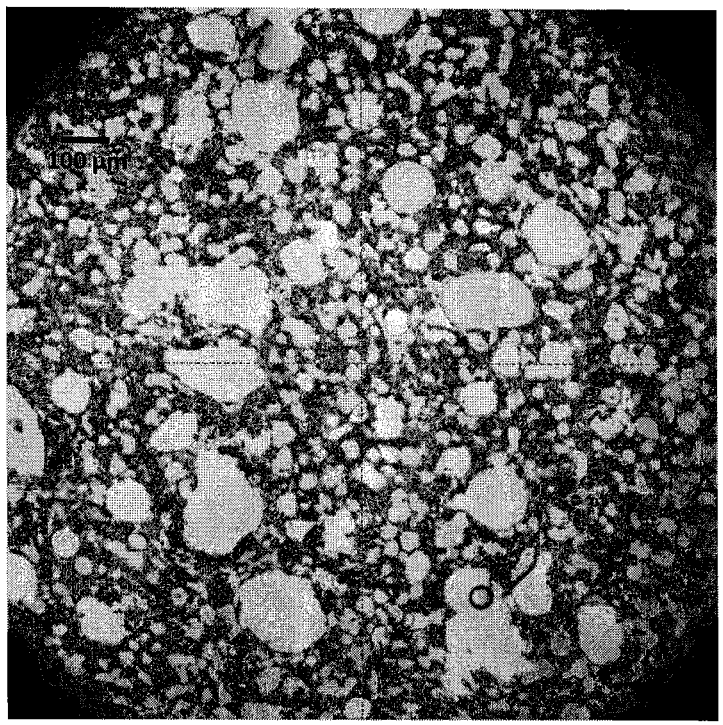
Figure 2B:
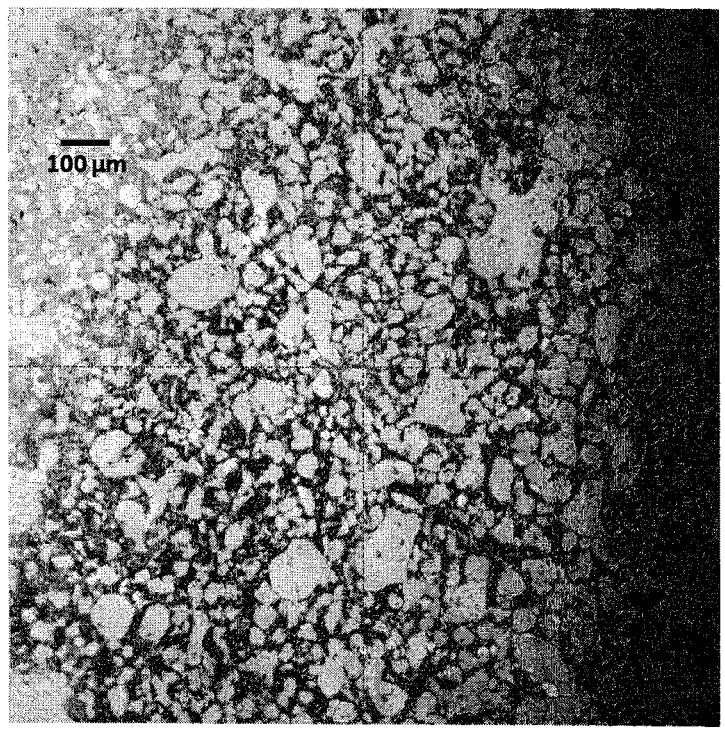

FIG. 2: show pictures obtained by cryo-substitution from a product according to the invention, freshly made (FIG. 2a) and after heat shock (FIG. 2b) respectively.

DETAILED DESCRIPTION OF THE INVENTION

In the manufacture of frozen confectioneries, emulsifiers and stabilisers play an essential role. Acacia gum was so far mainly known as a possible stabilizer for frozen confections. While stabilisers are generally used for adding viscosity, improving handling properties and also for preventing ice crystal growth, emulsifiers aid in developing the appropriate fat structure and air distribution necessary for the smooth eating and good meltdown characteristics desired in such products.

Acacia gum has also been mentioned in a list of natural emulsifiers in WO 2012/069727 together with egg yolk, buttermilk and rice bran extract. However, this prior art relates to super premium products with rather low overruns and requiring the presence of starch. Furthermore, the natural emulsifier in the described products has to be used in amounts of at least 0.5 wt %.

The applicant has now found that acacia gum had unexpected emulsifying properties when used at very low levels in highly aerated frozen confections. The emulsifying power required for frozen confections with high overrun is particularly challenging, the difficulty being to "hold" the air over time and avoid product shrinkage. Gum acacia turned out to outperform in comparison to other natural emulsifiers cited in the art, like buttermilk. According to a particular embodiment, the invention relates to frozen confection prepared by low temperature extrusion, a high shear process. The products of the invention were surprisingly able to hold the high overrun oven after such a high shear LTF process.

In the context of the invention, "natural" ingredients is meant to designate ingredients of natural origin. These include ingredients which come directly from the field, the animals etc. They may also include ingredients which are the result of a physical or microbiological/enzymatic process (e.g. filtering, drying, centrifugation, fermentation etc.). However, they do not include ingredients which are the result of a chemical modification process.

Unless otherwise specified, percentages are meant to designate percentages of dry matter by weight.

Also, the term "up to" is used to indicate the presence of a component where the lower limit is not critical and can be determined by a skilled artisan having the benefit of the present disclosure before him or her.

Methods:

Air Cell and Ice Crystal Sizes:

One method which can be used to measure air cell and ice crystal sizes is optical microscopy. This method is well known and described in the art.

Fat Globules and Agglomerates:

The method used to measure fat globules and fat agglomerates is fluorescence microscopy of resin sections of cryo-fixed (−20° C.) and resin cryo-infiltrated (−20° C.) frozen confections at a magnification of ×1440.

Protein-Fat Aggregates:

The method used to measure sizes of protein-fat aggregates is laser diffraction on e.g. a Mastersizer Micro Particle Size Analyzer, from Malvern Instruments Ltd (UK). These particle sizes can be measured in the mix as well as in the end product. For measurements, samples are dispersed in chilled water, degassed under vacuum to remove air bubbles, and measured according to the instructions of the instrument manufacturer. Frozen samples are allowed to melt before measuring.

Images:

Images can be produced by cryosubstitution. A small sample of ice cream is fixed in a mixture of acetic acid and acetone at −25° C. to stabilize the structure, followed by infiltration with resin. Microtome sections of 4 µm thickness are treated with a solution of toluidine blue. This provides contrast between the stained protein-continuous serum phase and the unstained portion of the section, representing air bubbles and ice crystals. Magnification of 100× provides a view of the size distribution of the bubbles and crystals.

According to a first aspect, the invention relates to an aerated frozen confection with an overrun comprised between 120% and 160% comprising from 0.5 to 20 wt % fat, from 5 to 15 wt % milk solids-non-fat, from 5 to 35 wt % of sweetening agent, up to 6 wt % of stabilizer and up to 0.5 wt % of a natural emulsifier comprising acacia gum.

Frozen confectionery products include ice cream, mellorine, frozen yogurt, frozen beverage, milk shake, frozen mousse, frozen fudge, frozen custard and other frozen desserts.

The applicant found that acacia gum known heretofore as stabilizer, had unexpected emulsifying properties when used at very low level. According to the invention acacia gum can thus be used either in combination with other natural emulsifier or preferably as sole emulsifier in frozen confection formulations and provides the required fat destabilization to get the appropriate fat structure and air distribution necessary for a smooth eating and good meltdown characteristics desired in products.

Preferably, acacia gum is used in amounts comprised between 0.1 and 0.5% by weight of the product. According to a particular embodiment, acacia gum is used as sole emulsifier.

The frozen confection of the invention further comprises from 0.5 to 20 wt %, preferably from 0.5 wt % and 12 wt %, more preferably from 0.5 wt % to 5.5 wt % fat. Fat can be from a dairy source, a vegetable source or mixtures thereof. Examples of fat include fresh cream, sour cream, cultured cream, butter, concentrated butter, cocoa butter, coconut oil, hazelnut oil, palm oil, palm kernel oil, canola oil, soybean oil and sunflower oil.

Milk solids-non-fat is then comprised in amounts comprised between 5 and 15 wt %, preferably between 9 and 12 wt % in the product of the invention. Typical sources of milk solids-non-fat include skimmed milk, whey protein concentrate, acid casein, sodium caseinate, acid whey, whey protein isolate, sweet whey, demineralised sweet whey, demineralised whey, milk protein concentrate or any mixtures thereof.

The frozen products of the invention also include 5 to 35 wt %, preferably 16 to 20 wt % sugars as part of a sweetening agent. By "sweetening agent" is to be meant a mixture of ingredients which imparts sweetness to the final product. Suitable sweetening agents include sugar, glucose syrups, and natural sugars like cane sugar, beet sugar, molasses, other plant derived nutritive sweeteners and natural non-nutritive high intensity sweeteners. Preferably, the sugars used in the present invention include mono- and di-saccharides.

The products also include a stabilizer, which preferably essentially consists of natural ingredients. Examples of natural stabilizers that can be used in the context of the invention include natural gums such as pectin, guar gum, locust bean gum, tara gum, xanthan gum, arabic gum, quillaia gum and agar or any mixtures thereof.

According to a particular embodiment, the aerated frozen confection of the invention is essentially free from, and preferably does not contain any, starch, egg yolk or lecithin. Existing solutions have used at least one of these ingredients which present several drawbacks. For example from a product standpoint, starch can be responsible for a chewy, gummy and sticky mouthfeel. Also starch is not very well perceived by consumers. On the other hand, egg yolk is known as being an allergen. Thus, "essentially free" means that the additive is present in an amount that would not impart a chewy, gummy and sticky mouthfeel or that would act as an allergen.

Preferably, the frozen confections of the invention are essentially free from non-natural ingredients.

"Essentially free" as used herein to describe other ingredients means that these materials are not intentionally added for their conventional properties imparting abilities, i.e., stabilizing, although there could be unintended minor amounts present without detracting from the performance of the products.

According to one embodiment, the product of the invention contains "protein aggregates", also here-in referred to as "protein-fat aggregates" which correspond to a coagulated protein system aggregated with fat and which can be characterised a particle size. It is noticed that those aggregates are different from fat globules or fat globules agglomerates which do not include protein and can also be measured in the products (see below). In the context of the invention, particle size of those aggregates is meant to designate their surface area mean diameter or the Sauter mean diameter $D[3,2]$ measured as mentioned above. The percentage in volume of those aggregates with a $D[3,2]$ comprised between 2.28 and 30 microns is comprised between 10 and 50%, and preferably between 22 and 35%. Those aggregates are preferably formed in situ during the processing of a frozen confection base mix comprising from 0.5 to 20 wt % fat, from 5 to 15 wt % milk solids-non-fat, from 5 to 35 wt % sweetening agent, up to 6 wt % of stabilizer and up to 0.5 wt % of a natural emulsifier comprising acacia gum. In particular, they are obtainable by adjusting the pH of such a frozen confection base mix to a value comprised between 5.8 and 6.3 before a heating step such as pasteurization.

The protein content of the base mix is preferably comprised between 2.0 and 6.0 wt %, preferably between 2.0 and 4.5 wt %.

pH values mentioned in the framework of the invention correspond to measures done at ambient temperature using standard equipment.

According to one embodiment, the frozen confections of the invention comprises from 0.5 to 6 wt % fat and have an average equivalent diameter $D[21]$ of fat globules or fat globules agglomerates measured as mentioned above below 10 microns.

The aeration or overrun in the context of the invention is produced by incorporation of gas into the confectionery product. The gas can be any food grade gas such as air, nitrogen, or carbon dioxide. The overrun is defined as follows: (Reference: Robert T. Marshall, Douglas Goff and Richard W. Hartel, 2003, Ice Cream—6th Edition, Ed. Kluwer Academic/Plenum Publishers (New York), ISBN 0-306-47700-9, page 144.)

$$\% \text{ overrun} = \frac{\text{wt of mix} - \text{wt of same vol. of ice cream}}{\text{wt of same vol. of ice cream}} * 100$$

Preferably, the products of the invention have an overrun comprised between 120% and 160%. According to a particular embodiment the overrun is comprised between 125% and 140%. Such high overruns, usually very difficult to hold in mainstream products could be obtained with the products of the invention and maintained without product shrinkage.

Another embodiment of the invention concerns a method for preparing an aerated frozen confection as defined above. Said method comprises the steps of:

a) preparing a base mix comprising from 0.5 to 20 wt % fat, from 5 to 15 wt % milk solids-non-fat, from 5 to 35 wt % of a sweetening agent, up to 6 wt % of a stabilizer and up to 0.5 wt % of a natural emulsifier comprising acacia gum;

b) homogenizing and pasteurizing the base mix; and c) freezing while aerating the mix to provide an end product with an overrun between 120% and 160%;

d) optionally, with hardening of the frozen mix.

Homogenization and pasteurization are carried out under standard conditions well known in the art. Pasteurization can for instance be performed by heating to a temperature comprised between 80° and 90° C. for 30 to 90 s. Homogenization is for example done at a pressure of between 40 and 250 bars, preferably between 80 and 245 bars, more preferably between 100 and 240 bars.

The homogenised mix may then be cooled to around 2 to 8° C. by known means. The mix may further be aged for 4 to 72 h at around 2 to 6° C. with or without stirring. Optionally, the addition of flavourings, colourings, sauces, inclusions etc. may be carried out prior to the ageing step or during the freezing step. If flavourings, colourings, sauces, inclusions etc. are added, these are preferably selected from natural ingredients only.

In the next step, the mix is frozen while aerated. In a preferred embodiment, the mix may be cooled to a temperature below −3° C., preferably between −3 and −10° C., preferably at about −4.5 to −8° C. with stirring and injection of gas to create the desired overrun, comprised between 120% and 160%.

The frozen mix is then optionally hardened.

According to a particular embodiment, the pH of the base mix is adjusted to a value comprised between 5.8 and 6.3. This adjustment can be done via the addition of an acidic component.

According to another embodiment, wherein the base mix comprises up to 6 wt % fat, step c) is followed by cooling the frozen mix to a temperature below −11° C. in an extruder, and the overrun provided in the end product is comprised between 120% and 140%. Preferably, the extruder is a twin screw extruder.

EXAMPLES

The invention is now going to be illustrated by the following examples which should not be considered as limiting the invention.

Example 1

Low Fat Aerated Frozen Confection with 150% Overrun after Standard Freezing (Primary Freezer) and 137% Overrun after Low Temperature Extrusion

TABLE 1

| Ingredient | wt % of final product |
|---|---|
| Base mix | |
| Fat | 5.5 |
| Sugar | 10-12 |
| Milk solids-non-fat | 9-11 |
| Acacia gum | 0.1-0.3 |
| Corn Syrup | 6-8 |
| Total solids | 35-37 |
| Natural stabilizer | 0.5 |

Citric acid and liquid brown sugar were added to reduce the pH of the base mix before pasteurization to 6.0-6.10. The base mix was then processed at below given parameters:

Homogenized at 1500 psi (Stage I), 500 psi (Stage II)

Pasteurized at 180° F. for 90 Sec.

Ice cream mix aged at 40-45° F. was cooled under continuous cooling/freezing to 20-24° F., while simultaneously aerating the product to an overrun of 150%. This primary freezing step was followed by low temperature freezing (LTF) in a twin screw extruder during which the product temperature was further reduced to 10-16° F.

The resultant product made by primary freezer and LTF yields a homogenous, smooth and creamy product with superior textural attributes and overrun of 137% was achieved. Furthermore, those products when having gone through heat shock testing exhibits superior quality than conventionally made ice cream.

The products with good texture attributes successfully achieved target weights at the filler, namely 632 g at 150% OR Primary freezer and 668 g at 137% OR LTF for 48FZ containers. When subjected to heat shock cycle, the product did not show signs of shrinkage.

FIG. 2) shows the images obtained by cryosubstitution (Toluidine blue staining, thin sections of resin-substituted ice cream, 3-5 microns thickness) of the fresh product (2a), respectively the heat shocked product (2b). A 10× objective was used. This yields a total magnification of approximately 100× in the images as viewed. Width of the field as shown (equal to the height for the square images) represents 1480 micrometers.

Image analysis (ImageJ software) was used to calculate the size distribution of the "holes" in the continuous phase (ice crystals and air bubbles) in these photos. Median equivalent diameter for the fresh sample was 37 micrometers, compared to 40 micrometers median for the heat shocked sample. This indicates good stability after heat shock.

Example 1 was repeated for a product with similar characteristics and final overrun of 126%. Similar conclusions were drawn.

Example 2

Full Fat Aerated Frozen Confection Processed by Standard Freezing

TABLE 2

| Ingredient | Wt % of final product |
|---|---|
| Base mix | |
| Fat | 10-12 |
| Sugar | 10-16 |
| MSNF | 9-11 |
| Acacia gum | 0.1-.0.3 |
| Corn Syrup | 3-5 |
| Total solids | 39-41 |
| Natural stabilizer | 0.2-0.5 |

Citric acid solution was used to lower the pH of the base mix to 6.1-6.3 before pasteurization. The mix was then processed as follows:

Pasteurized at 82° C. for 90 Sec

Homogenized at 1500 psi (Stage I), 500 psi (Stage II)

Ice cream mix aged at 40-45° F. was cooled under continuous cooling/freezing to 20-24° F., while simultaneously aerating the product to an OR of 150%.

The product could hold this overrun even after heat shock testing without any sign of shrinkage.

Example 3

Particle Size Distributions

Table 3 reports particle size data for products according to examples 1 and 2.

TABLE 3

| Sample No | Sample 1 (Ex 1) (126% OR, LTF) | Sample 2 (Ex 1) (137% OR, LTF) | Sample 3 (Ex 2) (150% OR, standard freezer) |
|---|---|---|---|
| D[3, 2] | 1.07 | 1.09 | 0.96 |
| % Vol under 2.28 μm | 64.06 | 63.44 | 72.02 |
| % vol 2.28-30 μm | 32.16 | 32.31 | 24.52 |

Measured were done as described above.

FIG. 1 shows the particle size distribution of those products. The second peak is representative of partial destabilization and agglomeration of fat and is representative of the emulsifying properties of the acacia gum.

Example 4

Comparative Example—Frozen Confections with Egg Yolk/Buttermilk and Egg Yolk

TABLE 3

| Ingredient | Wt % of final product |
|---|---|
| base mix | |
| Fat | 5.5 |
| Sugar | 9-12 |
| MSNF | 10.0 |

TABLE 3-continued

| base mix | |
| --- | --- |
| Ingredient | Wt % of final product |
| Egg Yolk | <1.4 |
| Corn Syrup | 4-8 |
| Total solids | 35-39 |
| Natural stabilizer | <0.5 |

Citric acid and liquid brown sugar were used to reduce pH of the base mix to 6.0-6.10 before pasteurization. The base mix was then processed at below given parameters:

Pasteurized at 180 F for 90 Sec.

Homogenization at 1500 psi (Stage I), 500 psi (Stage II)

Freezing was carried out in similar conditions as described in Example 1.

It was observed that product had rough extrusion texture and popping at the filler. Also, target weights could not be achieved (i.e. 126% overrun).

Replacing in the base mix of Table 3 egg yolk by a mixture of egg yolk and buttermilk did not provide better results and no stable overrun could be obtained.

What is claimed is:

1. A method for preparing an aerated frozen confection, the method comprising:
   preparing a base mix comprising from 0.5 to 20% fat, from 5 to 15 wt % milk solids-non-fat, from 5 to 35 wt % of a sweetening agent, and up to 6 wt % of a stabilizer, the base mix further comprises 0.1 to 0.5 wt % of natural acacia gum that has not been subjected to a physical modification process, has not been subjected to a microbiological or enzymatic process, and has not been subjected to a chemical modification process, wherein the natural acacia gum is the sole emulsifier in the base mix;
   homogenizing and pasteurizing the base mix; and
   freezing while aerating the homogenized and pasteurized mix to provide an end product with an overrun between 120% and 160%, the natural acacia gum is the sole emulsifier in the aerated frozen confection that is the end product, the aerated frozen confection comprises protein-fat aggregates, and 10 to 50% of the protein-fat aggregates by volume have a D[3,2] between 2.28 and 30 microns, wherein the aerated frozen confection is selected from the group consisting of ice cream, mellorine, frozen yogurt, frozen beverage, milk shake, frozen mousse, frozen fudge, and frozen custard.

2. The method of claim 1, wherein the pH of the base mix is adjusted to a value between 5.8 and 6.3.

3. The method of claim 1, wherein the mix comprises up to 6% fat, the freezing of the mix while aerating is followed by cooling the frozen mix to a temperature below −11° C. in an extruder, and the overrun provided in the end product is between 120 and 140%.

4. The method of claim 3, wherein the extruder is a twin screw extruder.

5. The method of claim 1, further comprising an acidification step before the pasteurizing.

6. The method of claim 5, wherein the acidification step adjusts the pH of the base mix to a value between 5.8 and 6.3.

7. The method of claim 1, wherein the homogenizing comprises a two-stage homogenizing process.

8. The method of claim 1, wherein the stabilizer is selected from the group consisting of pectin, guar gum, locust bean gum, tara gum, xanthan gum, arabic gum, quillaia gum, agar and mixtures thereof.

9. The method of claim 8, wherein the base mix consists of the fat, the milk solids-non-fat, the sweetening agent, the stabilizer, and the natural acacia gum.

10. The method of claim 1, wherein the fat is 0.5 wt. % to 5.5 wt. % of the base mix and is selected from the group consisting of fresh cream, sour cream, cultured cream, butter, concentrated butter, cocoa butter, coconut oil, hazelnut oil, palm oil, palm kernel oil, canola oil, soybean oil, sunflower oil and mixtures thereof.

11. The method of claim 1, wherein the milk solids-non-fat is between 9 wt. % and 12 wt. % of the base mix.

12. The method of claim 1, wherein the protein-fat aggregates are formed in situ during processing of the base mix.

13. The method of claim 1, wherein the aerated frozen confection comprises up to 6% fat, and an average equivalent diameter (D21) of fat globules or fat globule agglomerates is less than 10 microns.

14. The method of claim 1, wherein the overrun of the aerated frozen confection is between 125% and 160%.

15. A method for preparing an aerated frozen confection, the method comprising:
   preparing a base mix comprising from 0.5 to 20% fat, from 5 to 15 wt % milk solids-non-fat, from 5 to 35 wt % of a sweetening agent, and up to 6 wt % of a stabilizer, the base mix further comprises 0.1 to 0.5 wt % of natural acacia gum that has not been subjected to a chemical modification process, wherein the natural acacia gum is the sole emulsifier in the base mix;
   homogenizing and pasteurizing the base mix; and
   freezing while aerating the homogenized and pasteurized mix to provide an end product with an overrun between 120% and 160%, the natural acacia gum is the sole emulsifier in the aerated frozen confection that is the end product, the aerated frozen confection comprises protein-fat aggregates, and 10 to 50% of the protein-fat aggregates by volume have a D[3,2] between 2.28 and 30 microns, and wherein the aerated frozen confection is selected from the group consisting of ice cream, mellorine, frozen yogurt, frozen beverage, milk shake, frozen mousse, frozen fudge, and frozen custard.

16. The method of claim 15, wherein the pH of the base mix is adjusted to a value between 5.8 and 6.3.

17. The method of claim 15, wherein the mix comprises up to 6% fat, the freezing of the mix while aerating is followed by cooling the frozen mix to a temperature below −11° C. in an extruder, and the overrun provided in the end product is between 120 and 140%.

18. The method of claim 15, wherein the stabilizer is selected from the group consisting of pectin, guar gum, locust bean gum, tara gum, xanthan gum, arabic gum, quillaia gum, agar and mixtures thereof.

19. The method of claim 18, wherein the base mix consists of the fat, the milk solids-non-fat, the sweetening agent, the stabilizer, and the natural acacia gum.

* * * * *